March 14, 1944.
E. B. ALLRED
2,344,015
ALKYLATION
Filed Dec. 10, 1941
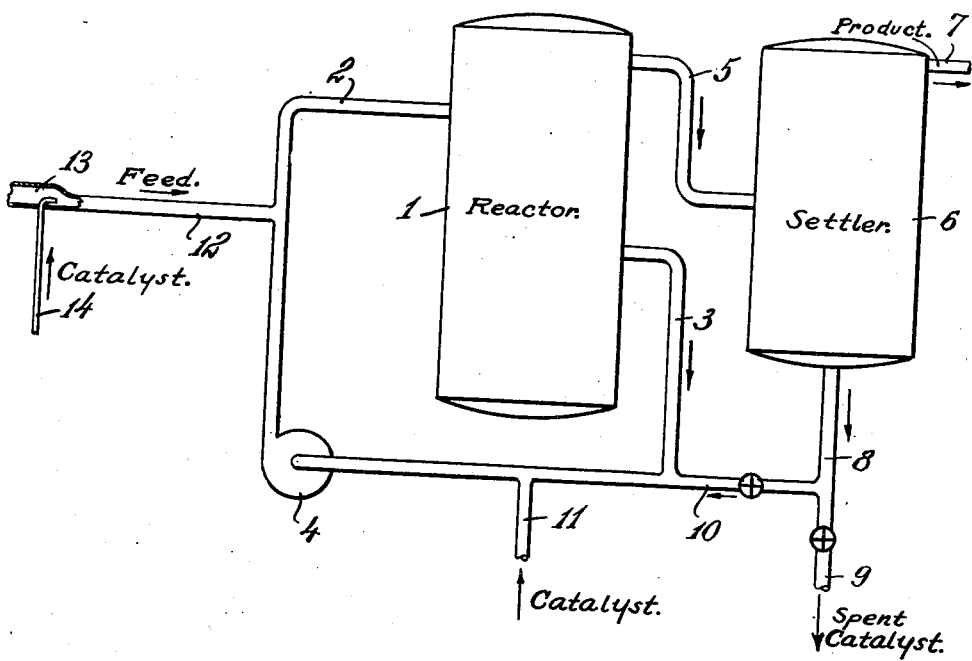
INVENTOR
ERNEST BOYD ALLRED
BY
ATTORNEY Patented Mar. 14, 1944

2,344,015

UNITED STATES PATENT OFFICE 2,344,015

ALKYLATION

Ernest Boyd Allred, Beaumont, Tex., assignor to Socony-Vacuum Oil Company, Incorporated, New York, N. Y., a corporation of New York Application December 10, 1941, Serial No. 422,355

4 Claims. (Cl. 260—683.4)

This invention relates to a process for alkylation and is particularly concerned with a manner of contacting paraffins with olefins for reaction therebetween in the presence of a fluid catalyst.

Processes of the present type have been developed and, in general, are characterized by certain features more or less common to all such processes as commercially practiced. It is usual to provide a reaction zone from which products and a stream for recirculation are drawn. The latter feature arises from the necessity for maintaining in the reaction mass a very high ratio of paraffins to olefins to minimize polymerization of the latter. The fresh feed stock contains a large excess of paraffins over that theoretically required for complete reaction and accumulation of that excess through recirculation rapidly builds up the high ratio desired. Because of the fact that catalysts now in use have a different specific gravity than and are immiscible with the hydrocarbon reactants and reaction products, this recirculation is of further advantage in that it provides continuous agitation of the mass and thereby maintains a mutual dispersion of catalyst and hydrocarbons.

These process steps, as well as the usual practice of settling catalyst from the withdrawn product and recycling a portion of the settled catalyst to the reaction mass, are conventional and have bearing on the present invention only in that they are generally recognized features of processes in which the invention is applied. The present novel concept relates to the manner which the fresh catalyst is supplied to the reaction mass and contemplates introduction of catalyst to the system for replacement of spent catalyst withdrawn from the system in such a manner as to cause the reaction to proceed more efficiently and thereby produce a greater yield of increased value.

The novel aspect of the present invention is, briefly, introducing a minor proportion of the fresh catalyst directly to the fresh feed stock containing olefins and paraffinic hydrocarbons before said fresh feed stock is brought into contact with and caused to react in the presence of the full proportion of catalyst used for causing the desired reaction.

The single figure of the drawing annexed hereto shows diagrammatically an apparatus for continuous alkylation of isobutane with butylene in the presence of a strong acid catalyst such as sulphuric acid, hydrofluoric acid and the like. A reaction chamber 1 is provided with an inlet line 2 and a discharge pipe 3 connected in series through a centrifugal pump 4 to form a circuit external to the reaction zone and to which the catalyst and charge are supplied. A portion of the contents of chamber 1 is continuously withdrawn through pipe 5 and passed to a settling tank 6 from which are withdrawn crude products containing unreacted butanes and partially spent acid catalyst through lines 7 and 8, respectively. A portion of the catalyst withdrawn through line 8 is removed from the system by means of valved discharge 9 and the remainder is returned to the reaction circuit by valved line 10 to flow with the reactor discharge in line 3 and fresh catalyst admitted through line 11 to pump 4 wherein the whole is thoroughly mixed and forced through line 2 for return to chamber 1. Fresh feed stock comprising isobutane and butylene in the desired ratio from feed line 12 is brought into confluence with and enters the reactor admixed with the discharge of pump 4.

The apparatus assembly described above and the described manner of operating the same are somewhat conventional. I have found that marked advantages in operation and yield are obtained if a minor proportion of the fresh acid catalyst is supplied to the system by admixture with the fresh feed stock as by spraying such minor proportion of acid into an enlarged portion 13 of the line 12 from a relatively small catalyst feed pipe 14. It will be apparent to those skilled in the art that many means may be employed for proportioning the acid catalyst feed through lines 11 and 14 and many means are known which may be employed for admixing the fresh feed stock and the minor proportion of acid catalyst supplied thereto. Further, the mixing zone 13 may be equipped with suitable cooling means such as are normally used in various regions of acid catalytic apparatus of the present type without departing from the spirit of the invention.

The preferred proportion of fresh acid added directly to the feed stock will, of course, vary with changes in other values in operation of the system. Changes in percentages of acid, olefin and hydrocarbon added or in reaction temperatures will necessarily render advisable reconsideration of the proportioning of fresh acid between lines 11 and 14. In general, however, the amount of acid added directly to the feed stock before it contacts the reaction mass containing large excess of paraffins, products of the reaction and partially spent acid will be relatively small, substantially less than 50% of the fresh catalyst supplied to the system and preferably less than about 25%.

In a typical operation wherein the ratio of isobutane to butylene in the charge stock is 7:1 while the circulation was maintained at such a rate that the isobutane-butylene ratio is around 50:1 at the point of confluence of feed stock with recycled material and the period required for complete circulation of materials is about 8 to 9 minutes, marked advantages may be obtained by adding 20% of the fresh acid directly to the feed stock.

I claim:

1. In a process for reacting olefins with paraffin hydrocarbons by withdrawing from a reaction zone a stream of reaction mass comprising a liquid catalyst and hydrocarbons, separately adding to said stream fresh catalyst and a fresh charge stock mixture of olefin and paraffin hydrocarbon, and returning to said reaction zone said stream containing said added material, the step which comprises adding fresh liquid catalyst to said fresh charge stock in an amount less than that added to said stream before said charge stock is added to said stream.

2. In a process for reacting olefins with paraffin hydrocarbons by maintaining within a reaction zone a reaction mixture containing olefins, paraffin hydrocarbons, a fluid catalyst and reaction products, withdrawing a portion of said mixture from said zone for recovery of reaction products and adding to another withdrawn portion of the mixture fresh catalyst and a hydrocarbon charge mixture of olefins and paraffin hydrocarbons; the step which comprises injecting a minor proportion of said fresh catalyst into said charge mixture before the latter contacts the reaction mixture and injecting a major proportion of said catalyst directly into said reaction mixture.

3. A process according to claim 1 wherein the amount of fresh catalyst added to said fresh charge stock constitutes not more than about 25% of the total fresh catalyst charged to the process.

4. In a process for reacting isobutane with butylene by withdrawing from a reaction zone a stream of reaction mass comprising a sulfuric acid catalyst and hydrocarbons, separately adding to said stream a major portion of fresh catalyst and a mixture of a minor portion of a fresh catalyst and a fresh charge stock comprising isobutane and butylene, and returning to said reaction zone said stream containing said added material, the step which comprises adding said fresh charge stock to said stream as a mixture in a ratio of about seven parts of isobutane to each part of butylene in admixture with about 20% of the total amount of fresh catalyst added to said stream.

ERNEST BOYD ALLRED.